United States Patent [19]
Porter et al.

[11] Patent Number: 5,472,577
[45] Date of Patent: Dec. 5, 1995

[54] FLUID PUMPING SYSTEM BASED ON ELECTROCHEMICALLY-INDUCED SURFACE TENSION CHANGES

[75] Inventors: Marc D. Porter; David K. Hoffman; Chuan-Jian Zhong, all of Ames, Iowa

[73] Assignee: Iowa State University Research Foundation, Ames, Iowa

[21] Appl. No.: 268,846

[22] Filed: Jun. 30, 1994

[51] Int. Cl.[6] .................... C25B 15/02; C25B 11/18; C25B 9/00

[52] U.S. Cl. .................. 204/1.11; 204/250; 204/263; 204/273; 204/DIG. 9; 204/220

[58] Field of Search .................. 204/1.11, 219–220, 204/250, 252–258, 263–266, 251, 273, DIG. 9

[56] References Cited

U.S. PATENT DOCUMENTS

| | | | |
|---|---|---|---|
| 2,848,409 | 8/1958 | Szechtman | 204/220 |
| 3,427,539 | 2/1969 | Mann | 204/250 X |
| 3,607,705 | 9/1971 | Nagle | 204/220 |
| 3,701,868 | 10/1972 | Lucian | 200/192 |
| 4,583,824 | 4/1986 | Lea | 359/223 |
| 5,219,278 | 6/1993 | van Lintel | 417/413.1 |
| 5,224,843 | 7/1993 | van Lintel | 417/413.2 |

OTHER PUBLICATIONS

*Analysis of the Oscillations in "Beating Mercury Heart" Systems;* Keizer, et al.; *Journal of the American Chemical Society*/101:19/Sep. 12, 1979; pp. 5637–5649.
*Dynamics of Electrowetting Displays;* Beni, et al.; *J. Appl. Phys.* 52(10), Oct. 1981; pp. 6011–6015.
*Electrowetting Optical Switch;* Jackel, et al.; *Appl. Phys. Lett.* 40(1), 1 Jan. 1982; pp. 4–6.
*Hydrodynamic Mode Selection Due to the Electrocapillary Effect: The Mercury Beating Heart in Neutral and Basic Solutions;* Olson, et al.; *J. Phys. Chem* 1989, 93, 8253–8263.
*An Electrohydrodynamic Micropump;* Richter et al.; CH 2832–Apr. 1990 IEEE; pp. 99–104.
*The Fabrication and Use of Micromachined Corrugated Silicon Diaphragms;* Jerman; *Sensors and Actuators,* A21–A23 (1990); pp. 988–992.
*A Micro Chemical Analyzing System Integrated on a Silicon Wafer;* Nakagawa, et al.; CH 2832–Apr. 1990 IEEE; pp. 89–94.
*Microfabricated Electrohydrodynamic Pumps;* Bart et al.; *Sensors and Actuators,* A21–A23 (1990) 193–197.
*Micromachined Silicon Microvalve;* Ohnstein et al.; CH 2831–Apr. 1990 IEEE; pp. 95–98.
*Micropump and Sample–injector for Integrated Chemical Analyzing System;* Shoji, et al.; *Sensors and Actuators,* A21–A23 (1990) 189–192.
*Piezoelectric Micropump with Three Valves Working peristaltically;* Smits; *Sensors and Actuators,* A21–A23 (1990) 203–206.
*Preliminary Investigation of Micropumping Based on Electrical Control of Interfacial Tension;* Matsumoto, et al.; CH 2832–Apr. 1990 IEEE; pp. 105–110.
*A Thermopneumatic Micropump Based on Micro–engineering Techniques;* Van De Pol et al.; *Sensors and Actuators,* A21–A23 (1990) 198–202.

(List continued on next page.)

*Primary Examiner*—Donald R. Valentine
*Attorney, Agent, or Firm*—Leydig, Voit & Mayer

[57] ABSTRACT

A pump for exerting a pumping force on a fluid in an attached conduit, the pump being actuated by a voltage from a power supply, the pump comprising a liquid metal pool, a containment vessel for confining the pool, an inner tubular member in hydraulic contact with the attached conduit and with an open end disposed in the pool to divide a free upper surface of the pool into an actuation surface and a working surface, an electrolyte in contact with the actuation surface, an electrode in contact with the electrolyte, and an electrode in contact with the pool, such that application of a voltage to the electrodes causes a surface tension change in the actuation surface and a resulting height change in the working surface, whereby a pumping action is transferred to the fluid in the attached conduit.

30 Claims, 5 Drawing Sheets

OTHER PUBLICATIONS

*Large Deflection Performance of Surface Micromachined Corrugated Diaphragms;* van Mullem, et al.; 91 CH 2817–May 1991 iEEE; pp. 1014–1017.

*Microactuation Based on Thermally–Driven Phase–Change;* Ji, et al.; 91 CH 2817–May 1991 IEEE; pp. 1037–1040.

*Novel Approaches to the Construction of Miniaturized Analytical Instrumentation;* Porter, et al; *SAE 22nd International Conference on Environmental Systems,* Paper No. 921179; 1992.

*Pumping of Water Solutions in Microfabricated Electrohydrodynamic Systems;* Fuhr, et al.; 0–7803–0497–Jul. 1992 IEEE; pp. 25–30.

*A Study of a High–Pressure Micropump for Integrated Chemical Analysing Systems;* Shoji; *Sensors and Actuators A,* 32 (1992) 335–339.

*Integrated Micro–Liquid Dosing System;* Lammerink et al.; 0–7803–0957–Feb. 1993 IEEE; pp. 254–259.

*Performance of Non–Planar Silicon Diaphragms Under Large Deflections;* Zhang et al.; pp. 284–288.

Bard et al.; *Electrochemical Methods: Fundamental and Applications; Wiley,* New York 1980; pp. 494–497.

Adamson; *Physical Chemistry of Surfaces;* InterScience, New York; 1982; pp. 10–13.

FLUID PUMPING SYSTEM BASED ON ELECTROCHEMICALLY-INDUCED SURFACE TENSION CHANGES

FIELD OF THE INVENTION

The present invention relates generally to pumping systems, and more particularly to an improved miniature or micro-scale pump.

BACKGROUND OF THE INVENTION

A wide variety of applications exist for miniature or micro-scale pumping systems. Such applications typically require pumping of small volumes of liquid or gases on a periodic basis. One example of an application for a miniature or micro-scale pump would be in controlled drug delivery, as delivery of insulin to a diabetic. A miniature pump including a supply of insulin could be carried either on the person, or theoretically implanted within the patient, for controlled delivery of insulin at appropriate times throughout the day. Miniature pumps could also be adapted for use in micro-chemical analysis and monitoring in a wide variety of fields and for micro-synthesis. In the environmental field, for example, a given quantity of chemicals could be periodically tested by pumping out a small sample by means of a miniature pump and performing the necessary analysis on that small sample perhaps with the required analyzing chemicals being similarly pumped. A wide variety of other applications for miniature pumps could also be envisioned.

Miniature pumps to meet these applications have been under extensive development for about the last decade. Most of these miniature pumping devices are based on either thermal, electrohydrodynamic, or piezoelectric actuation phenomenon. In the case of thermal or electrohydrodynamic systems, miniaturization can be achieved, but the resulting pumps have very low cycle times based on inherent limits in the actuation processes. As a result, the ability for such pumps to be incorporated into efficient pumping schemes is limited. The pumps based on the piezoelectric effect, on the other hand, have the required low cycle times. These devices, however, require very high voltages (on the order of 100 volts) for operation. The need for such a sizeable power supply can be quite limiting to implementation of such a pumping system, and may prevent use of such a pumping system depending upon the application. Thus, while miniature or micro-scale pumps are in existence, they have practical limitations which prevent their efficient implementation.

SUMMARY OF THE INVENTION

In view of the foregoing, it is an important aim of the present invention to produce a miniature pumping system having improved operational characteristics as compared to previous miniature pumps.

In accordance with that aim, it is the primary object of the invention to provide a miniature pump having a low power consumption, while providing the necessary operational characteristics for practical implementation.

Another object is to provide a miniature pump that is more reliable than those which use mechanical pumping mechanisms.

A related object is to provide a liquid pump with no moving mechanical parts.

A further related object is to provide a pump mechanism that is stress and friction-free.

A related object of the invention is to provide for micro-miniaturization of the pumping system.

A further related object is to provide a pumping system which may be fabricated by integrated circuit fabrication techniques so as to be buildable on integrated circuits.

Another object of the invention is to provide a miniature pump, the operation of which is easily and reliably controlled to provide for a versatile range of operation.

In accordance with these and other objections an advantages of the invention, there is provided a miniature liquid metal actuator based on surface tension changes at the interface of a metallic liquid/electrolytic liquid interface as induced by electro-chemically controlled modulation of surface charge. The actuator comprises a containment vessel which contains a quantity of the liquid metal, the liquid metal having a free upper surface, where "free" is used in the sense that the surface is not constrained by the containment vessel, and is thus free to move, e.g. to rise and fall. An inner tubular member is disposed within the containment vessel, and has an open end submerged in the liquid metal such that a quantity of liquid metal rises to a pre-determined level in the tube by means of capillary action. The presence of the inner tubular member thus divides the free surface of the liquid metal into a working surface (the surface internal to the tube) and an actuation surface, (the surface between the inner tubular member and the containment vessel). A quantity of electrolyte is disposed within the containment vessel and is in contact with the actuation surface of the liquid metal. A first electrode is in contact with the liquid metal, and a second electrode is in contact with the electrolyte. A potential difference is applied across the first and second electrodes. The application of this potential difference causes a surface tension change at the actuation surface. This in turn causes the radius of curvature of the actuation surface to change. Since the remainder of the liquid metal except for the working surface is constrained by the containment vessel, this surface tension change is translated into a movement of the working surface in the tubular member. This movement of the working surface within the inner tube causes a pressure change in the inner tubular member above the working surface. This pressure change is then applied to performing useful work.

In one embodiment of the invention, the actuator is used as a minature pump. In this embodiment, the pressure change caused by movement of the working surface is applied to a liquid or gas (referred to collectively herein as "fluids") in hydraulic contact with the working surface in order to pump the fluid. The quantity of the liquid metal in the inner tube can also be periodically reciprocated by varying the applied voltage so that it serves as a piston-type pumping member. The liquid or gas to be pumped may either be in direct contact with the working surface, or may be indirectly coupled to the working surface. The containment vessel in this embodiment is a test tube and the liquid metal is a mercury pool. The inner tubular member comprises a T-shaped member with a central extension being disposed within the test tube, and having an open end disposed within the mercury pool located in the bottom of the test tube. The electrolyte is disposed above the mercury in the test tube. A platinum electrode is imbedded in the bottom of the test tube to make contact with the mercury. The second platinum electrode is wound around the inner tube placing the electrode in contact with the electrolyte. By application of a voltage, the height of mercury in the central tube can be varied to affect a pumping action on the fluid in the horizontally extending remainder of the T-shaped tube. Preferably, a square wave voltage is applied and check valves are included in the T-shaped member to establish the direction of pumping and to prevent backflow during the pumping operation.

In an alternative embodiment of the invention, a pumping system is realized in micro-miniature scale. The various elements of the pumping system are formed in planar substrates such as silicon or glass by either micro-machining or conventional integrated circuit processing techniques. Such techniques also are used to form the necessary electrodes. The constituent layers are then bonded together. The necessary liquid metal and electrolyte are then introduced into the structure for actuation by application of varying voltages according to the invention. In the micro-scale embodiment, an indirect coupling of the pump and the material being pumped is preferably used. A thin membrane of the substrate material is maintained in place above the working surface. Actuation of the pump causes the pressure behind the membrane to rise and fall according to the position of the working surface, whereby a pumping action is transmitted through the membrane to the fluid to be pumped.

In a related implementation, such pumps are used in a pressurized fluid system, and the membrane is configured to be movable between positions where it pinches off and opens the conduit flow of the pressurized fluid. In this implementation, movement of the membrane to an open position allows pressurized fluid to flow, while returning of the membrane to the pinching off position prevents flow of the pressurized fluid and squeezes out the fluid in the area near the membrane.

The embodiments just summarized are characteristic of the invention in that they include a quantity of a liquid metal divided into an actuation surface and a working surface by the presence of a central tube. An electrolyte is in contact with the actuation surface of the liquid metal and the electrolyte and liquid metal are each in contact with electrodes, such that application of a potential through these electrodes causes movement of the working surface by inducing a change in the radius of curvature in the actuation surface, which change is translated through the confined fluid to the working surface. The dimensions of the various components and the nature of the applied voltage signal can be varied to achieve the desired results for a variety of applications.

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
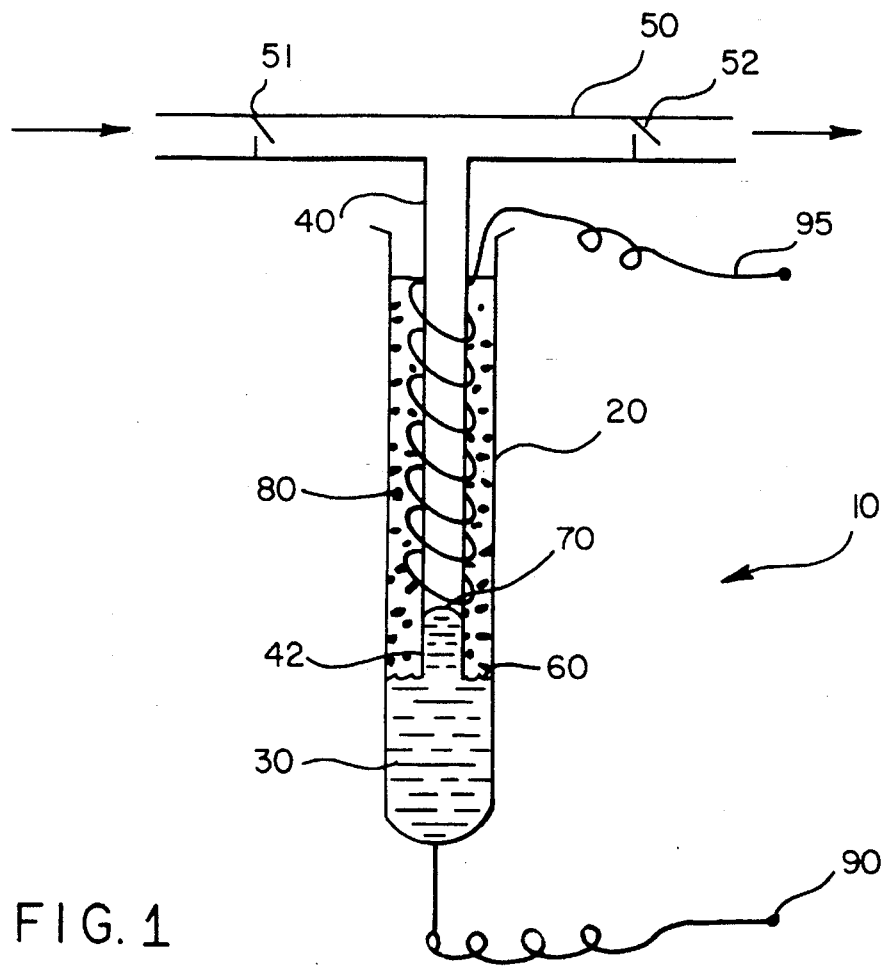
FIG. 1 is a diagram schematically illustrating a miniature pump according to one embodiment of the invention.

Turning now to the drawings, FIG. 1 shows a miniature pump 10 according to the invention. Pump 10 includes a containment vessel, which in this embodiment is in the form of a test tube 20. A quantity of liquid metal, which in this embodiment is mercury (herein "Hg") is pooled in the bottom of the test tube 20, as shown by reference numeral 30. A tubular member 40 is placed inside the test tube 20, with its open end inserted into the Hg pool 30. In this embodiment, the tubular member 40 is the downwardly extending portion of a larger T-shaped member 50. As indicated by the arrows in FIG. 1, the fluids to be pumped flow through the horizontal portion of the T-shaped member 50. Included within this horizontal portion are check valves 51 and 52, which will be discussed further below.

Since the open end of tubular member 40 is placed within the Hg pool 30, a quantity of Hg 42 rises up within the tubular member 40 by means of capillary action. Thus, the free upper surface of the Hg within tubular member 40 is at a different height then the remaining upper surface of the Hg within the test tube 20. The free upper surface of the Hg pool 30 is thus divided into an actuation surface (the surface between tubular member 40 and the outer wall of test tube 20) and a working surface (the surface within tubular member 40). The actuation surface is designated by reference numeral 60 and the working surface is designated by reference number 70. An electrolyte solution 80 is also present in the test tube 20 and is in contact with the actuation surface 60 of the Hg pool 30. One electrode 90 is imbedded in the test tube 20 and is in electrical contact with the Hg pool 30. The other electrode 95 is in contact with the electrolyte. In this embodiment, the electrode 95 is wound around tubular member 40, although other means for making contact between electrode 95 and electrolyte 80 may be employed.

By means of application of a voltage across electrodes 90 and 95, the pump 10 may be actuated. The basis of actuation is a phenomenon known as the electrocapillary effect, which is described in detail in *Oscillations in "Beating Mercury Heart" Systems*, Keizer et al.; Journ. Am. Chem Soc'y 101:19; Sep. 12, 1979, pp. 5637 et seq. According to this effect, the surface tension at the interface between the Hg 30 and the electrolyte 80 is at a maximum at a potential of a zero charge (pzc). The pzc of a given material such as Hg can be determined with reference to a standard hydrogen electrode. For Hg in contact with an electrolyte, the pzc will typically be −0.4 to −0.6 V depending upon the electrolyte. If voltages either positive or negative of the pzc are applied across the Hg/electrolyte interface, an increase in the charge density at the actuation surface results. This excess charge in turn induces a change in the surface tension and thus a change in the radius of curvature of Hg in the outer tube 20 according to the configuration of FIG. 1. Since the remainder of the Hg, except for the free working surface in the tubular member 40, is confined by the containment vessel, this change in the radius of curvature in the actuation surface translates into a change in height of the working surface 70. This change in height of the working surface 70 results in a pressure change within the inner tubular member 40. It is this pressure change which is used to drive solution flow through the tube 50. Since the electrocapillary effect which results in pumping occurs at the electrolyte/Hg interface, that surface is referred to herein as the actuation surface. According to an advantage of the invention, this actuation surface is a liquid/liquid interface thus eliminating mechanical wear, for instance that due to friction. As a further advantage, the use of a liquid metal for actuation potentially allows use of non-linear cavities such as a curved or bent inner tubular member. Use of such a cavity would not be possible with a conventional mechanical piston-type pump. Further, since movement of the Hg surface in the tubular member 40 results in the pressure changes which leads to pumping action, that surface is referred to herein as the working surface.

By controlling the voltage applied to the electrodes 90 and 95, miniature pump 10 may be adapted to various applications. For example, a square voltage waveform may be applied to the electrodes to reciprocally drive working surface 70 in the manner of a piston pump, which would serve to continuously pump fluid in tube 50. Alternatively, pump 10 may be periodically cycled through a single cycle (or a limited number of cycles) for the purpose of injecting a small metered sample of fluid. In any event, with a pump having the structure of FIG. 1, the height of the working surface is adjusted by controlling the applied voltage to achieve the desired function. The heights of the actuation and working surfaces, and thus the pump displacement, are dependent upon the magnitude and, to a lesser extent, the polarity of the applied voltage with respect to the pzc of the Hg. To provide for accurate control and variability of the applied voltage, a waveform shaping device may advantageously be connected across the electrodes. The applied voltages can then be easily programmed and modified to achieve desired results. Further, the voltages could also be applied by some form of remote control. For example, a receiver could be connected across the electrodes such that receipt of a remotely—generated signal could actuate the pump. Such a feature could be advantageous, for example, in allowing a physician to remotely control delivery of a drug, a supply of which is carried in or on a patient.

In a prototypical model of the embodiment shown in FIG. 1, the inner tubular member had a 1 millimeter internal diameter, and the test tube had a 3 millimeter diameter. In that prototype, height displacements in the inner tubular member 40 as large as 3 millimeters were induced by application of only a 1 volt difference between the electrodes 90 and 95. The pumps according to the invention are therefore able to operate with low voltage requirements. The differential pressure ($\Delta p$) derived from application of a voltage difference across the electrodes is equal to $2\Delta\gamma/r$ where $\Delta\gamma$ is the change in surface tension at the actuation surface 60 as induced by the applied voltage difference, and r is the radius of the inner column. The aqueous solutions typically used for the electrolyte 80 have an accessible voltage window which leads to a maximum value for $\Delta\gamma$ of approximately 100 dyn/cm. This value translates to a calculated value for $\Delta p$ of 0.06 psi for the 1 millimeter inner tubular member 40. These induced pressure differences are more than sufficient to provide a wide range of flow rates including flow rates as low as a few nanoliters per minute. Of course significantly higher flow rates can also be achieved. Such flow rates would be useful in a wide variety of applications, particularly given the potential for microminiaturization of the pump to be discussed in greater detail below. The pressure a differential $\Delta p$ can also be estimated from the experimentally measured displacement of the height of the Hg column in tube 40. This relationship is given by $\Delta p = \rho g \Delta h$ where $\rho$ is the density of Hg and g is the acceleration due to gravity. Since 3 millimeter displacements were found in a 1 millimeter central tubular member 40, this translates to pressure differential of 0.06 psi in agreement with the predictions based on surface tension above.

The miniature pump shown in FIG. 1 thus achieves adequate pumping action combined with low power consumption and simplicity while delivering useful flow rates. Further, since all of the moving members of the pump are liquids, mechanical wear due to friction is avoided. To facilitate the pumping action on the fluid being pumped through the T-shaped member 50, the pumping system may illustratively include the check valves 51 and 52. The check valves would be in place to directionalize the flow and to prevent any backflow during the pumping operation. Illustratively, valve 51 would be open and 52 would be closed during downward stroke of the working surface 70, thus allowing fluid to flow to the right in the sense of FIG. 1 through check valve 51. During upward stroke of the working surface 70, check valve 51 would close, and check valve 52 would be opened to allow continued flow to the right without backflow through check valve 51. The check valves which we have used with some success thus far are: model 6-06473-18 by Cole-Parmer; model #300 by Smart Pumps, Inc.; and model CD-5 by Dionex Co.

Figure 2:
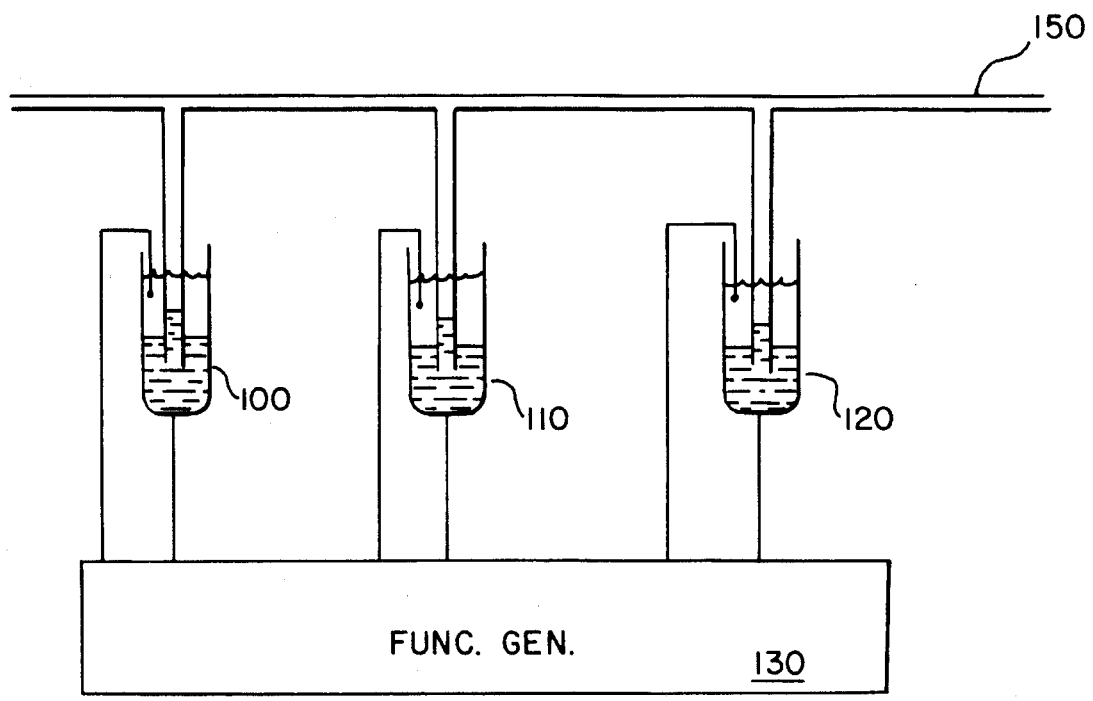
FIG. 2 is a diagram schematically illustrating a series of miniature pumps arranged to provide a peristaltic pumping action.

Check valves themselves are not necessary for the practice of the invention, and alternative means for preventing backflow may be employed. As an example, a series of pumps may be grouped together to achieve the same results, as shown FIG. 2. FIG. 2 shows several miniature pumps 100, 110 and 120 arranged in series to provide a peristaltic pumping action. The three pumps 100, 110 and 120 are of similar design and function as compared to the pumps shown in FIG. 1. To provide for peristaltic pumping action, the three pumps are sequentially actuated. In this embodiment that sequential actuation is controlled by a waveform shaping device in the form of a function generator 130. By controlling the delay timing and periodicity of the actuations of three pumps, a peristaltic action can be achieved. For example, a peristaltic pumping action could be achieved by sequentially causing an upward stroke of the working surface in each of the three pumps, and subsequent maintenance of the working surfaces in the upward position. Assuming some quantity of fluid present in fluid conduit 150, actuation of the first pump 100 by the function generator would move that fluid to the right in the sense of FIG. 2. Sequential actuation of pump 110 and 120 would continue to move the fluid in conduit 150 to the right in the sense of FIG. 2. Backflow would be prevented through 150 by the back pressure built up by each pump being maintained with its working surface in the raised position. Following sequential actuation of the three pumps, the working surfaces in each of the pumps could be brought back to a lower position, which would preferably also occur sequentially. It will be appreciated by one skilled in the art that by properly selecting the delay timing and periodicity of the output of the function generator, a variety of desired pumping characteristics and flows could be achieved with the use of a system according to FIG. 2. Further, it would be appreciated that three pumps have been shown in FIG. 2 for the purposes of illustration only, and that two pumps or more could be advantageously used for such a function.

Returning to the generalized pump of FIG. 1, we have varied certain structural and operational parameters of the miniature pump shown there for the purposes of optimization. Different electrolytes, including 0.5M KOH and 0.5M $Na_2SO_4$ were used, with the later giving preferable function. One skilled in the art will appreciate that a variety of aqueous and non-aqueous electrolytes may be advantageously used. We have also found that the displacement of the working surface can be increased for a given induced voltage by a hydrophobic treatment of the inner tubular member 40. According to this embodiment, the preferred metal to use for composition of the electrode is platinum, although a variety of other metals could potentially be used. Potential between electrodes 90 and 95 can be illustratively switched between −0.1 and −1.6 volts to effectively actuate the pump 10. For an applied square voltage wave form, frequencies up to 1 KHz were successfully used. Of course, one skilled in the art will appreciate that pump throughput may be advantageously increased by increasing the frequency of operation. Furthermore, the geometry of the containment vessel 20 and the inner tubular member 40 is not limited to being circular, and other shapes may be advantageously used. Also, the relative cross-sectional dimensions of the containment vessel and the inner tubular member may be advantageously adjusted to achieve optimal pumping efficiently. It will be appreciated by one skilled in the art that these various design parameters may all be optimized and modified as may be necessary to achieve particular design requirements for a given application. Most importantly, and according to the invention, the pump should include an actuation surface in contact with an electrolyte such that an applied voltage causes a surface tension and radius of curvature change at the actuation surface which translates through the confined fluid and results in displacement of a separate working surface for pumping a hydraulically contacted fluid.

Figure 3:
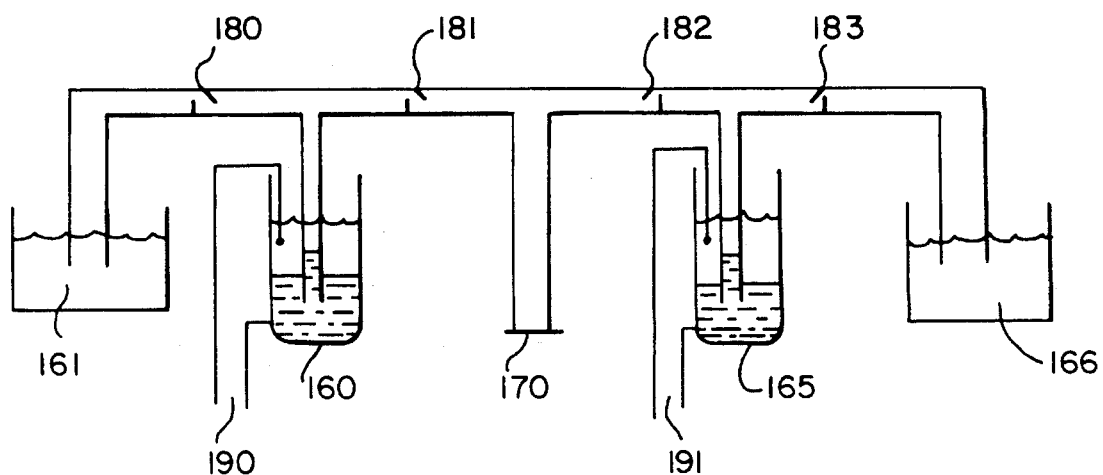
FIG. 3 is a diagram schematically illustrating a chemical analysis system using miniature pump according to the invention.

FIG. 3 shows a chemical analysis system using the pumps as describe in reference to FIG. 1. The two pumps 160, 165 are each connected to a source of chemicals. Illustratively, pump 160 is connected to a source 161 of the chemical to be analyzed, referred to herein as the analyte. Pump 165 is connected to a source 166 of the chemical being used for analysis, referred to herein as the carrier. Through the action of pumps 160 and 165, the analyte and carrier are injected into a test chamber 170, illustratively in the form of a vertical column. To directionalize the fluid flow, and to prevent backflow during actuation of each of the pumps, each pump includes two check valves, designated by reference numerals 180–183 and all shown in the open position for ease of reference. By applying properly selected voltages to electrodes 190, associated with pump 160; and electrodes 191 associated with pump 165, a metered amount of both analyte and carrier can be injected into test column 170. Either a single stroke of each of the pumps 160, 165 can be used, or a series of consecutive strokes could be used to move the proper amount of analyte and carrier into the column 170. The embodiment of FIG. 3 thus represents a practical implementation using the pumps as described in reference to FIG. 1. As with all implementations of the pumps according to this invention, advantages are realized given the low power requirements and simplicity of construction of these pumps.

Figure 4:
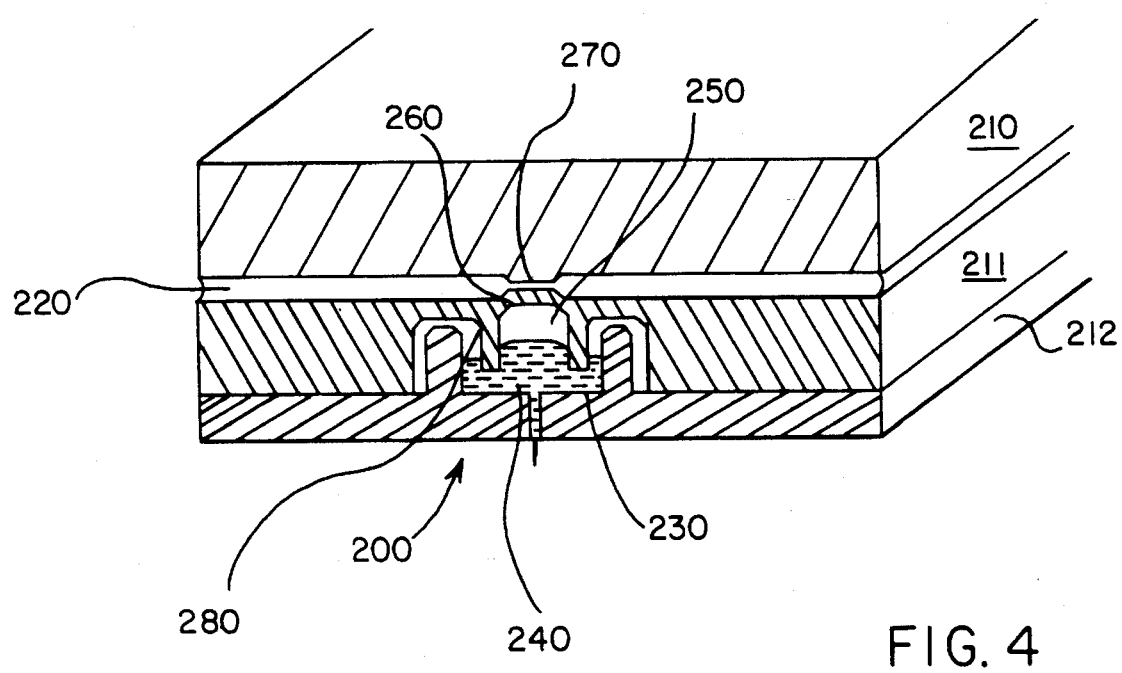
FIG. 4 is a diagram schematically illustrating a cross-sectional view of a micro-miniature pump according to an alternative embodiment of the invention.

FIG. 4 shows a further practical implementation of a miniature pump according to the present invention, but reduced to a micro-miniature scale. FIG. 4 is a cross-sectional view of a micropump 200 formed in a substrate such as silicon or glass. Other potential substrates includes GaAs, carbon, plastics, ceramics or any other materiable processable by the micro-machining or integrated circuit fabrication techniques used to form the micro-miniature devices herein described. According to this embodiment, micropump 200 is formed by bonding three substrate layers 210, 211 and 212 each having geometry formed therein for forming pump 200 and its associated flow conduit 220. Micropump 200 in FIG. 4 includes a containment vessel 230 for receiving the metallic liquid, illustratively Hg, designated here by reference numeral 240. Pump 220 also includes an inner tubular member 250, with an open bottom end immersed in a Hg 240 to allow the quantity of Hg to rise in the member 250 by capillary action.

In the previous embodiments, the upper or working surface of this Hg was illustratively in direct contact with the fluid being pumped. In the present embodiment, however, a thin membrane is in place between working surface 250 and the flow conduit 220. This thin membrane bears reference numeral 260. Membrane 260 is thin, typically on the order of 3 microns in thickness, and is illustratively formed of $SiO_2$ in the case of a silicon substrate 211. The membrane 260 is responsive to the pressure differentials placed upon it by actuation of the micropump 200 and movement of tens of microns can be achieved by application of pressure on the order of a few psi. Such membranes are described in *Performance of Non-Planar Silicon Diagphragms Under Large Deflections*, Zhang, et al., IEEE, 1993, p. 284., the teaching of which are incorporated herein by reference. Membrane 260 works in conjunction with a depression 270 in the flow conduit 220. Pump 200 may be designed such that membrane 260 moves into and out of contact with depression 270 for the purpose of opening and pinching off flow conduit 220 in this region. The drawing inward of diaphragm 260 during opening and its outward extension during pinching off of this area of flow conduit 220 translates into a pumping action on the fluid present in the conduit.

In a related implementation, pump 200 may be used in an environment where the liquid in conduit 220 is pressurized. In this implementation, movement of the membrane from the pinch off position to the open position allows the pressurized fluid to flow. Return of the membrane to the pinch-off position both prevents further flow and exerts a nominal pumping action on the fluid by squeezing the fluid out from between membrane 260 and indentation 270. Thus, according to this embodiment of the invention a "pumping action" includes both fluid movement induced by pressure differentials generated by a pump in hydraulic contact with a fluid conduit, as well as the squeezing action just described in connection with use of the pumps in systems including pressurized fluids. Since pump 200 in this implementation serves primarily to regulate flow of pressurized fluid in conduit 220, the pump serves the function of a valve. Here, then, the pressure differential resulting from the induced movement of the working surface is used to perform the useful work of opening and pinching off the conduit 220. It will thus be appreciated that the broadest aspect of the invention is as a liquid metal actuator having the structure described herein (i.e. a contained liquid metal with a free surface divided into working surface and an actuation surface) where the pressure differential generated by induced movement of the working surface is used to perform useful work—illustratively including pumping and valving as described herein.

Returning to FIG. 4, it will be seen that by virtue of the presence of membrane 260, there is no direct contact between the fluid being pumped and the working surface of the Hg 240. For the purposes of this description, such indirect contact between the fluid being pumped and direct contact, as was shown in FIG. 1, will be generally referred to herein as hydraulic contact. That is, hydraulic contact may be interpreted as contact between a miniature pump according to the invention and the fluid being pumped for the purpose of transferring a pumping action to that fluid.

The micropump 200 of FIG. 4 also includes a quantity of electrolyte 280 disposed within containment vessel 230 above the actuation surface of the Hg 240. By making electrical contact to the electrolyte 280 and to the Hg 240 and applying a voltage across these fluids, the translation of the working surface previously referred to in reference to FIG. 1 can be achieved in the micropump 200 in FIG. 4.

Figure 5:
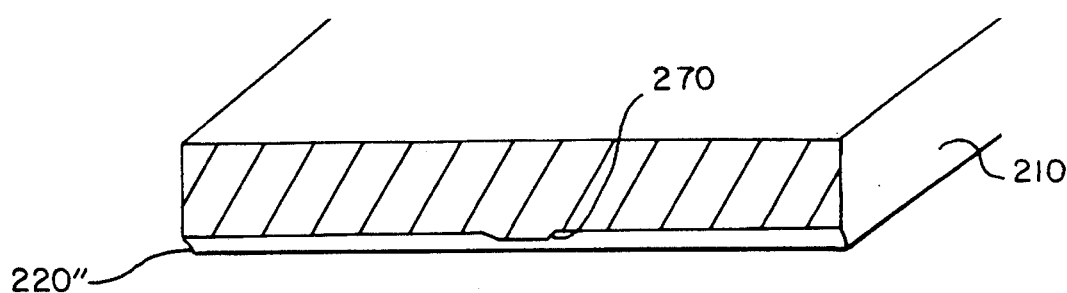
FIG. 5 is a diagram schematically illustrating an exploded view of the layers comprising the pump of FIG. 4.
Figure 5:
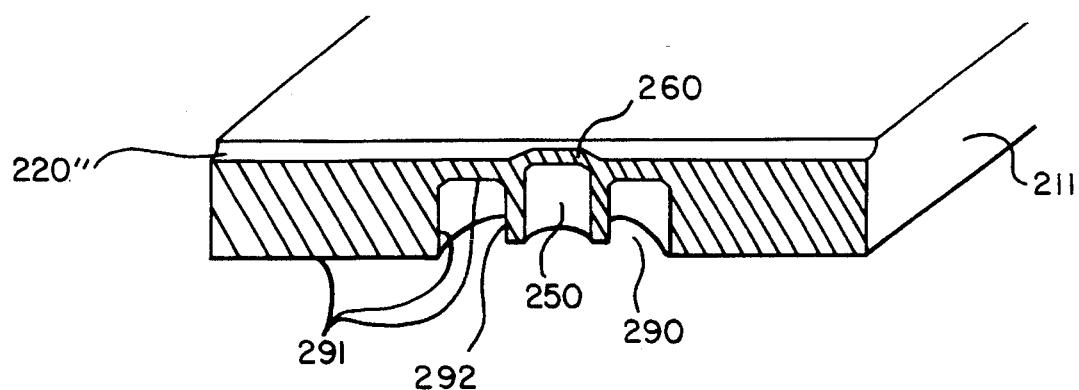
Figure 5:
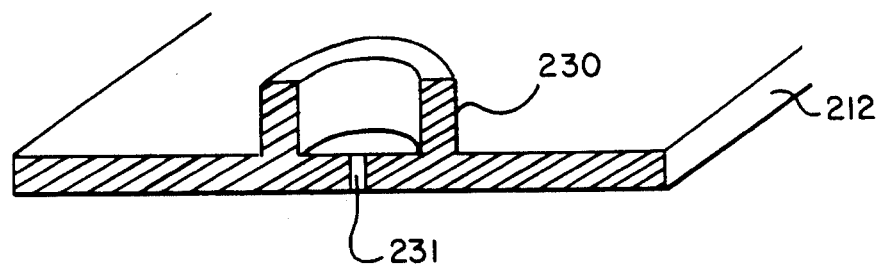

The various components of the micropump 200 can be seen more clearly in reference to FIG. 5 which shows the various substrate layers of the micropump 200 prior to their being bonded together to form the pump. The containment vessel 230 is formed in the bottommost layer 212. Illustratively, it may be formed by etching concentric circles in a substrate to lead to fabrication of the annular vessel shown in FIG. 5. The processing of substrate 212 will preferably include an etching step to provide an access hole 231 in the vessel 230 so that Hg can be injected following assembly of the device. Further, access hole 231 will also preferably be metallized so that electrical contact to the Hg can be achieved. The top surface of vessel 230 may be coated with a compressible polymer filling to ensure a tight sealing of the electrolyte in the assembled structure.

Several processing techniques are used on layer 211. First, a trough 220' is formed in the top of layer 211, and will serve as the bottom half of the flow conduit of the completed device. Trough 220' does not have a uniform cross-section, as an indentation 260 is included, which will eventually become the membrane which separates the micropump 200 from the flow channel 220. The bottom of layer 211 is then processed to form the central tubular member 250. At the upper end of central tubular member 250, membrane 260 is formed illustratively by the process described in the Zhang article, above. An annular chamber 290 is also formed in the bottom of the substrate 211 for receiving the containment vessel 230 upon bonding together of the various layers of the pump 200. As can be seen by reference to FIG. 4, annular chamber 290 will enclose both the actuation surface of the Hg and the electrolyte 280. Accordingly, a metallization layer is preferably included on the surfaces indicated at 291 for the purpose of making electrical contact to the electrolyte 280. Depending on the fluid levels in chamber 290, metallization of surface 292 may also be required for this purpose.

Layer 210 is also a processed prior to bonding. The upper half 220" of the flow channel 220 is formed in layer 210 As in trough 220', trough 220" includes an indentation 270. As previously described, membrane 260 moves in and out of engagement with indentation 270 according to the position of the working surface in the Hg according to the invention.

Following fabrication of the various layers shown in FIG. 5, they are bonded together to form the completed pump 200 and accompanying flow conduit 220. Following the bonding step, the liquid metal and necessary electrolyte may be injected into the completed structure by a variety of means. Electrical connections are made to the electrolyte and liquid metal, respectively, via the metallization layers in the substrate as previously described. The fill hole 231 is illustratively epoxied closed to prevent escape of the Hg. The thus assembled pump 200 may then be operated according to the invention as described in reference to FIG. 1. That is, voltages or voltage wave forms may be applied to the electrode in contact with the electrolyte 280 and liquid metal 240 for the purpose of controlling the height of the working surface of the liquid metal 240, and accordingly the position of the membrane 260 for either exerting a pumping action on the fluid in flow conduit 220 or for regulating the flow of a pressurized fluid through flow conduit 220.

Figure 6:
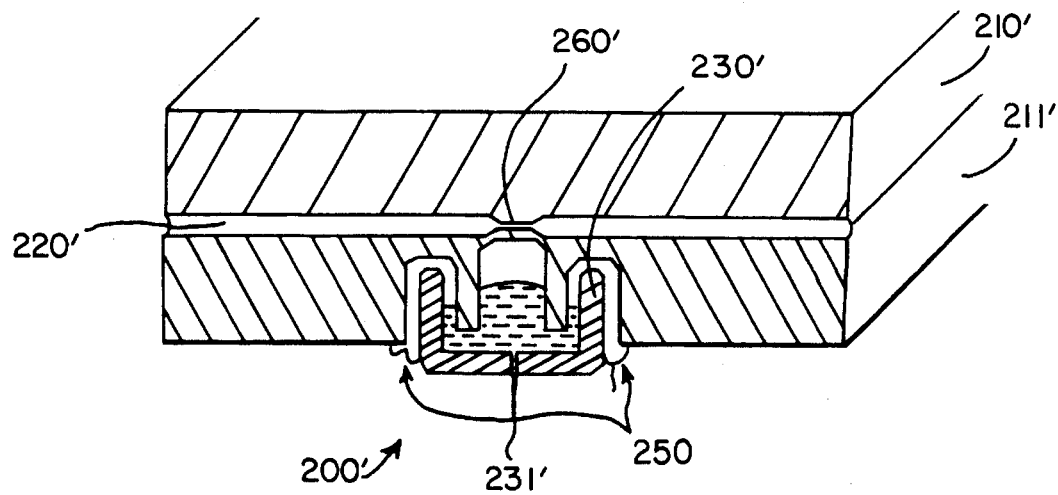
FIG. 6 is a diagram schematically illustrating an alternative micro-miniature pump according to the invention.

An alternative embodiment of the micropump according to the invention is shown in FIG. 6. The top two layers of the pump 200' of FIG. 6 are identical to the top two layers of the pump 200 of FIG. 4. Accordingly, they have been designated by reference numerals 210' and 211'. Instead of a third layer as in FIG. 4, a separate containment vessel 230' is epoxied to bottom layer 211' at epoxy points designated by reference numeral 250. Containment vessel 230' is illustratively a glass capillary including a central filling hole 231' through which Hg may illustratively be injected to form the liquid metal pool in the pump 200'. Further, electrolyte may be illustratively injected through epoxy points 250 for the purpose of fabricating pump 200'. Again, a membrane 260' is formed over the working surface in order to provide physical separation while maintaining hydraulic contact between pump 200' and flow channel 220'. The operation of pumps 200' is identical to that described in reference to the pump 200 of FIG. 4.

Figure 7:
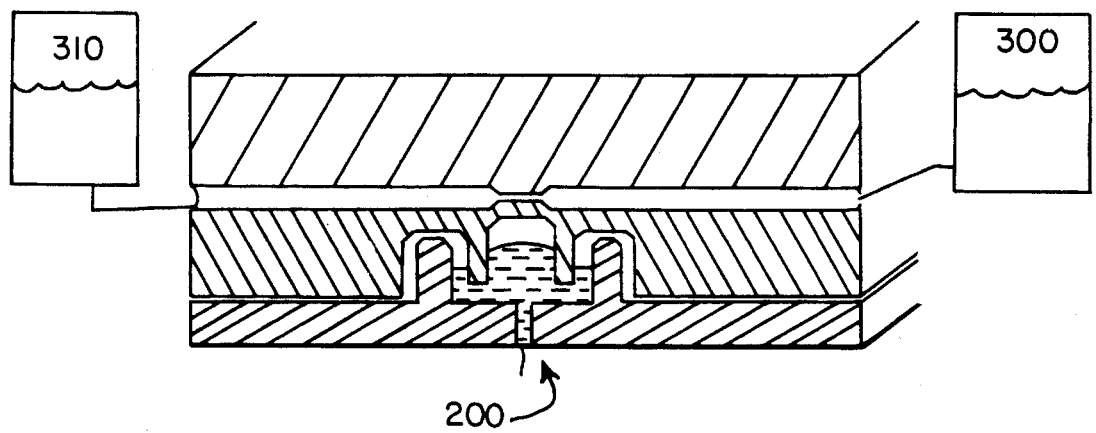
FIG. 7 is a diagram schematically illustrating a chemical monitoring station incorporating a micro-miniature pump according to the invention.

In accordance with a preferred use of the embodiments shown in FIGS. 4 and 6, pump 200 may be used in a valve configuration as an injection device for a chemical analysis and monitoring implementation as depicted in FIG. 7. According to that implementation, the chamber 300 where testing of a given chemical source is to be carried out is downstream of the valve 200. The source 310 of the chemical to be tested (the "analyte") is upstream of that valve, and in fluid contact with flow channel 220. Further the analyte is pressurized such that the it will flow in conduit 220 upon movement of the membrane 260 away from the pinch off position. Testing of the analyte is only done on periodic basis. When testing is to be performed, valve 200 is used to inject a sample of the analyte into the testing chamber. Thus, between testing cycles, the necessary voltage is applied between electrolyte 280 and metal liquid 240 to pinch off flow channel 220 in the area between membrane 260 and indentation 270. Just prior to the time of desired testing, the voltages are modified to allow membrane 260 to come out of contact with indentation 270, thus allowing a sample of the analyte to flow to the right in the sense of FIGS. 4 and 6. Subsequently, the voltages are adjusted to move the working surface upwardly, restoring membrane 260 to the pinch-off position with indentation 270. Accordingly, by properly programming and varying the voltages applied to the valve 200, it may also be used as a simple injection device on a periodic basis, as opposed to a continuous periodically pumping pump device. The use of valve 200 as an injection device may be further enhanced by connecting a number of microvalves in series and using a peristaltic arrangement as previously described in reference to FIG. 2. In distinction to the macro system of FIG. 2, however, the peristaltic action will be enhanced in the micro-scale implementation since the pinching-off action of membrane 260 and indentation 270 prevents any backflow during an upward stroke of a downstream microvalve. Again, it will be appreciated by those skilled in the art that by varying the delay time and the magnitude of the applied voltage to the valve 200, desired operational features may be achieved.

Figure 8:
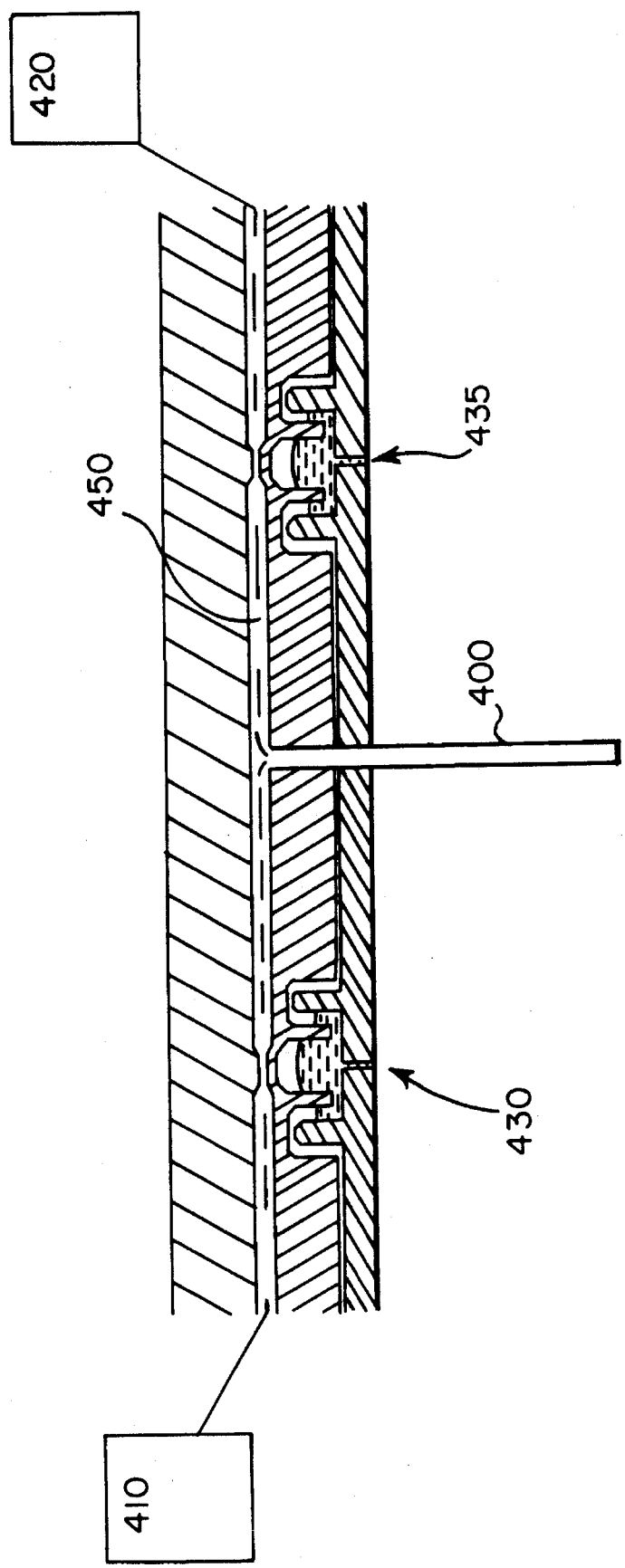
FIG. 8 is a diagram schematically illustrating a chemical analysis device incorporating micro-miniature pumps according to the invention.

In accordance with another preferred use of the embodiments shown in FIGS. 4 and 6, two pumps used in valve configurations as shown in those embodiments may be used together as injection devices for a chemical analysis and monitoring implementation as depicted in FIG. 8. The chamber 400 where testing of a given analyte is to be carried out is downstream of both the valves 430 and 435. The source 410 of the analyte to be tested is upstream of valve 430, and in fluid contact with the flow channel 450. The source 420 of the analyzing chemical (or "carrier") to be used for the testing is upstream of the valve 435 and is also in fluid contact with the flow channel 450. Upon actuation of the two valves 430 and 435, quantities of both the analyte and the carrier are injected into the column 400 for the purpose of performing the analysis, which is illustratively liquid phase chromatography. Both the analyte and the carrier are pressurized in the embodiment of FIG. 7, such that the chemicals will flow in conduit 450 upon movement of the membranes in the valves 430 and 435 away from their pinch off positions. When testing is to be performed, valves 430 and 435 are used simultaneously to inject samples of both the analyte and the carrier into the testing chamber 400. Between testing cycles, the necessary voltage is applied between the electrolyte and metal liquid in their respective pumps to pinch off the flow channel 450 in the areas above each of the valves 430 and 435. Just prior to the time of desired testing, these voltages are modified to allow the membranes to come out of contact with the indentations in the flow channel 450, thus allowing a sample of both the analyte and the carrier to flow toward the testing chamber 400 in FIG. 7. Subsequently, the voltages are adjusted to move the working surfaces of the valves 430 and 435 upwardly, restoring the valves to the pinch-off position where the membranes are in contact with indentations in the flow conduit 450. Following analysis in the test chamber 400, the analyzed and analyzing chemicals may be pumped out of the bottom of the chamber, thus readying the system for a later test cycle.

There has thus been disclosed a pumping system and method in both a miniature and micro-miniature scale. In either case, the pump includes separate actuation and working surfaces defined in the free surface of the confined metal liquid. An induced charge on the actuation surface leads to a change in surface tension and radius of curvature of that surface. Because the remainder of the liquid except the working surface is confined, that change in curvature is transmitted through the confined liquid to change the height of the working surface within an inner tubular member disposed within the metal liquid pool. Variation of voltages can lead to different pumping functions. In the micro-miniature scale, a membrane may separate the working surface from the fluid being pumped. Further, the micropump may be advantageously used in a system including pressurized fluid, such that the micropump serves as a valve to pinch off and open the flow conduit for the pressurized fluid. The pumps described herein are advantageous and that they give reliable and easily programmable operation and have very low power requirements as would allow for actuation by a battery or other dc source. Further, the pumps include, only liquid moving members to avoid undue mechanical wear. Moreover, the ability to reduce the pump to the micro-scale allows integration of such pumps with existing micro-fabrication techniques.

What is claimed is:

1. A pump for exerting a pumping force on a fluid in an attached conduit, the pump being actuated by a voltage from a power supply, the pump comprising:

a liquid metal pool, a containment vessel for confining the pool, an inner tubular member in hydraulic contact with the attached conduit and with an open end disposed in the pool to divide a free upper surface of the pool into an actuation surface and a working surface, an electrolyte adapted for contact with the actuation surface, an electrode adapted for contact with the electrolyte, and an electrode adapted for contact with the pool, such that application of a voltage to the electrodes causes a surface tension change in the actuation surface and a resulting height change in the working surface, whereby a pumping action is transferred to the fluid in the attached conduit.

2. The pump system of claim 1, wherein the containment vessel is a test tube including an electrode imbedded in the bottom surface for contact with the pool.

3. The pump system of claim 1, wherein the working surface is in direct fluid contact with the attached conduit.

4. The pump system of claim 1, wherein a flexible membrane is disposed between the working surface and the attached conduit.

5. The pump system of claim 4, wherein the membrane is engagable with an opposing sidewall of the attached conduit to pinch off flow in the attached conduit depending on the height of the working surface.

6. The pump system of claim 1, wherein the liquid metal is mercury.

7. The pump system of claim 1, including at least one check valve in the attached conduit to prevent backflow of the fluid being pumped.

8. The pump system of claim 7, wherein a check valve is placed both upstream and downstream of the pump.

9. The pump system of claim 1, including a waveform shaping device for applying a square wave voltage to the electrodes.

10. The pump system including at least two pumps as described in claim 1, the pumps being connected in series in hydraulic contact with the attached conduit.

11. The pump system according to claim 10, including a waveform shaping device for applying voltages to each pump to provide for a peristaltic pumping action on the liquid in the attached conduit.

12. A pump system according to claim 11, wherein the closing of an upstream pump in the peristaltic pumping prevents backflow of the fluid being pumped through the upstream pump.

13. The pump system of claim 1, wherein the containment vessel is formed in a first substrate layer, and the inner tubular member is formed in a second substrate layer, the first and second layers being bonded together to form the pump.

14. The pump system of claim 13, wherein an annular chamber is formed in the second substrate layer for receiving the electrolyte.

15. A low powered metered mixing device for mixing controlled volume of analyte and carrier fluids to a test chamber, the analyte and carrier fluids being carried in a conduit in fluid contact with sources of both fluids comprising in combination:

first and second liquid metal pumps the first for pumping analyte, each including a pool of liquid metal confined within a containment vessel, an inner tubular member in fluid contact with the conduit, and with an open end disposed in the pool to divide the free upper surface of the pool into an actuation surface and a working surface, an electrolyte adapted for contact with the actuation surface, an electrode adapted for contact with electrolyte, and an electrode adapted for contact with the pool;

check valves between the respective fluid source and the associated pump, and between each pump and the test chamber for directing pumped flow from the respective fluid sources to the test chamber;

whereby voltage waveforms applied to the pump electrodes mix measured volumes of analyte and carrier in the test chamber for analysis.

16. A valve for regulating the flow of pressurized fluid through an attached conduit, the valve being actuated by a voltage from a power supply, the valve comprising:

a liquid metal pool, a containment vessel for confining the pool, an inner tubular member with an open end disposed in the pool to divide a free upper surface of the pool into an actuation surface and a working surface, an electrolyte adapted for contact with the actuation surface, an electrode adapted for contact with the electrolyte, and an electrode adapted for contact with the pool, such that application of a voltage to the electrodes causes a surface tension change in the actuation surface and a resulting height change in the working surface, the inner tubular member including a membrane selectively moveable between a pinch off position and an open position with respect to the conduit according to the position of the working surface.

17. The valve system of claim 16, wherein the containment vessel is formed in a first substrate layer, and the inner tubular member is formed in a second substrate layer, the first and second layers being bonded together to form the pump.

18. The pump system of claim 17, wherein the flow conduit is supplied with pressurized fluid, the pinch off position of the membrane preventing flow of the pressurized fluid, and the open position of the membrane allowing flow of the pressurized fluid.

19. A metered mixing device including two valves as claimed in claim 16, a first valve being in hydraulic contact with a section of the flow conduit in contact with a pressurized source of analyte fluid, and a second valve being in hydraulic contact with a section of the flow conduit in contact with a pressurized source of carrier fluid, the section of the flow conduit between the valves being in fluid contact with a test chamber, whereby voltage waveforms applied to the electrodes of the valves causes opening and pinching off of the valves so as to inject a metered quantity of the analyte and carrier fluid into the test chamber.

20. A liquid metal actuator, the actuator being actuated by a voltage from a power supply, the actuator comprising:

a liquid metal pool, a containment vessel for confining the pool, an inner tubular member with an open end disposed in the pool to divide a free upper surface of the pool into an actuation surface and a working surface, an electrolyte adapted for contact with the actuation surface, an electrode adapted for contact with the electrolyte, and an electrode in contact with the pool, such that application of a voltage to the electrodes causes a surface tension change in the actuation surface and a resulting height change in the working surface, whereby a pressure differential is created above the working surface in the inner tubular member.

21. A method for pumping a fluid in a conduit comprising the steps of:

providing a contained pool of a liquid metal;

dividing the free upper surface of the pool into a working surface in hydraulic contact with the fluid, and a separate actuation surface in contact with an electrolyte;

moving the working surface to exert a pumping action on the fluid by applying a voltage between the electrolyte and the pool to induce a surface tension and radius of curvature change in the actuation surface which is translated by the contained fluid into movement of the working surface.

22. The method for pumping fluid as claimed in claim 21, wherein the fluid flow is unidirectional thereby preventing backflow, and wherein the step of dividing the free, upper surface into a working surface and an actuation surface comprises introducing a tubular member into a portion of the free surface of the pool to allow a quantity of the liquid metal to rise in the tubular member by capillary action.

23. The method for pumping fluid as claimed in claim 21, and including applying square voltage waveform between the pool and the electrolyte to provide periodic reciprocation of the working surface.

24. A method wherein flow in a conduit containing pressurized fluid is regulated by applying the method of claim 21 to a plurality of points along the conduit resulting in a series of valves along the conduit.

25. The method of claim 24 wherein voltages are applied to the series of valves so as to provide a peristaltic pumping action to the fluid in the conduit.

26. The method of claim 24 wherein metered amounts of two pressurized fluids in contact with opposite ends of the conduit are injected into a test chamber intermediate two valves along the conduit for subsequent analysis of the fluids, comprising the steps of applying voltages to each valve to allow flow of the respective pressurized fluids toward the test chamber, and subsequently applying voltages to each valve to pinch off the conduit and prevent backflow of the injected fluids through the valves.

27. The method according to claim 21, wherein the voltage is applied by remote control.

28. A method for regulating flow of a pressurized fluid in a conduit, comprising the steps of:

providing a contained pool of liquid metal;

dividing the free upper surface of the pool into a working surface, in hydraulic contact with the fluid through a flexible membrane, and an actuation surface in contact with an electrolyte;

moving the working surface to exert a force on the membrane to cause it to selectively pinch off and open the conduit to restrict and allow flow of the pressurized fluid, the moving being achieved by applying a voltage between the electrolyte and the pool to induce a surface tension change and a radius of curvature change in the actuation surface which is translated by the contained fluid into movement of the working surface to induce a pressure change above the working surface and thereby exerting the force on the membrane.

29. The method of regulating pressurized fluid flow as claimed in claim 28, wherein a quantity of pressurized fluid in contact with the conduit is injected into a chamber in fluid contact with the conduit, the injection comprising the steps of:

moving the quantity to be injected toward the chamber by applying a voltage between the pool and the electrolyte to move the working surface to a position where flow of the pressurized fluid in the conduit is not restricted;

applying a voltage between the pool and the electrolyte to move the working surface to a position where flow in the conduit is restricted; and preventing backflow of the injected quantity by maintaining the working surface in a position where flow in the conduit is restricted.

30. The method according to claim 28, wherein the voltage is applied by remote control.

* * * * *